Feb. 14, 1950    A. H. HAGEN    2,497,355
FISHING FLOAT
Filed July 15, 1947
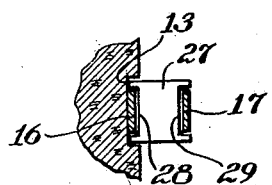
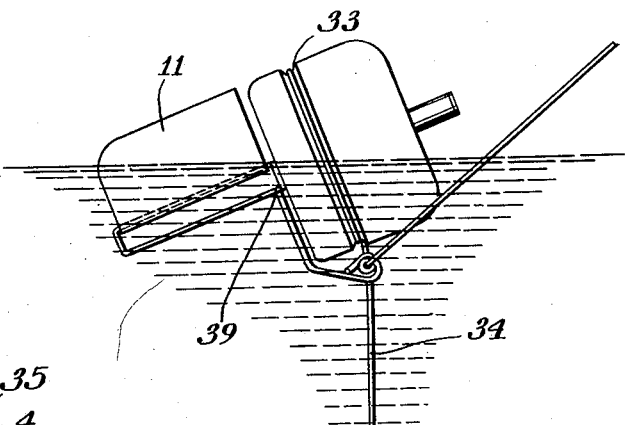
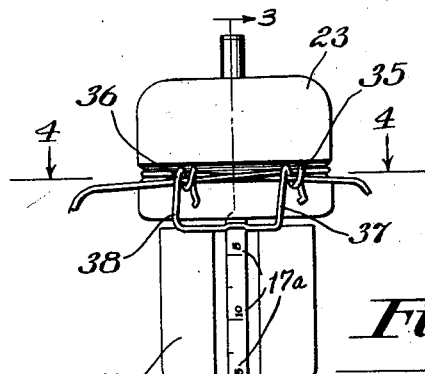
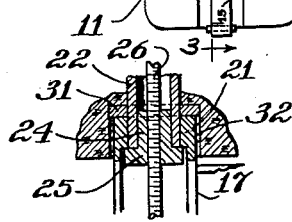
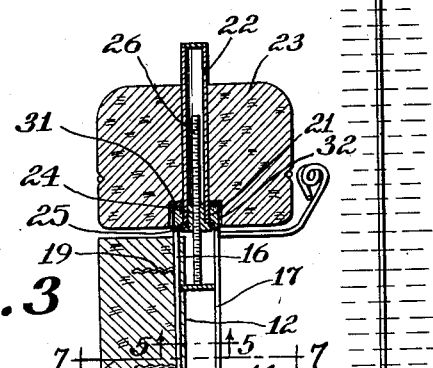
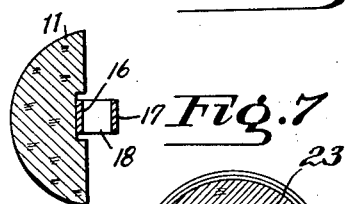
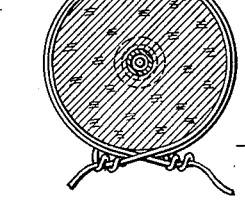
INVENTOR,
A. H. Hagen
BY Church & Church
ATTORNEY Patented Feb. 14, 1950

2,497,355

UNITED STATES PATENT OFFICE 2,497,355

FISHING FLOAT

Arthur H. Hagen, Globe, Ariz.

Application July 15, 1947, Serial No. 760,972

14 Claims. (Cl. 43—43.11)

This invention concerns fishing floats and particularly relates to a float which will measure out a predetermined length of fishing line to hold the sinker on the line at various selected depths below the float.

A major object of the invention is to provide a measuring type fishing float which may be attached to the fishing line while a sinker or hook is secured to the end of the line.

Another object of the invention is to provide a fishing float which is readily settable to hold a sinker at any selected distance from the float.

A further object of the invention is to provide a float which will remain on the line and still permit a sinker or hook at the end of the line to be reeled in close to the end of the rod.

Other objects and advantages of the invention will become apparent from the following specification taken in connection with the accompanying drawing wherein Figure 1 is an elevation of one embodiment of the invention showing a fishing float attached to the fishing line with a sinker lowered into the water;

Fig. 2 is a front elevation of the float shown in Fig. 1;

Fig. 3 is a longitudinal section taken on the line 3—3 of Fig. 2;

Fig. 4 is a cross-section taken on the line 4—4 of Fig. 2;

Fig. 5 is an enlarged partial sectional view taken on the line 5—5 of Fig. 3;

Fig. 6 is a partial longitudinal sectional view on an enlarged scale showing the rotating parts of the invention; and Fig. 7 is a cross-section taken on the line 7—7 of Fig. 3.

According to the invention in its preferred form, the fishing float is formed of a main section with a cylindrical section rotatable thereon. The main section carries a track which guides axial movement of a screw threaded into a nut rotatable with the cylindrical section. The cylindrical section is formed with a groove. Guides carried by the main section are positioned adjacent the groove so a fishing line may be threaded through one guide into the groove, around the cylindrical section, and through the other guide. As the line is reeled in or out, the rotatable section turns and causes axial movement of the screw. After a selected length of fishing line has passed through the guides, the screw reaches a stop and prevents further rotation of the cylindrical float section. In this way further movement of the line through the guides is arrested when the sinker has been lowered to a predetermined depth.

Referring now to the embodiment of the invention shown in the accompanying drawings, main float section 11 has a semi-cylindrical shape and its flat surface 12 is formed with a longitudinal recess 13 along its central portion. A track 14, having parallel sides 16 and 17 connected by end member 18, is secured in the recess 13 of the main float section 11 as by studs 19, 19. As shown in the drawings, the track 14 is arranged so its parallel sides extend longitudinally of the main float section 11.

At the upper end of the track, the ends of the parallel sides 16 and 17 are preferably integrally formed with a collar 21. The interior surface of the circular collar 21 acts as a bearing to rotatably support an elongated cylindrical sleeve 22 which is secured to and carries rotatable cylindrical float member 23. In one end of the sleeve 22, adjacent the collar 21, is secured a plug 24 having a rib 25 extending beneath the lower ends of sleeve 22 and collar 21. The plug is bored and threaded to receive screw 26. As shown most clearly in Fig. 5, the screw 26 has a rectangularly shaped head 27. In opposite sides of the rectangle are formed recesses 28 and 29, shaped to accommodate parallel sides 16 and 17 of the track 14. With this arrangement, the screw 26 is free to slide axially along the track, but is prevented from rotation relative to the track or the main float section 11. A washer 31 may be inserted in an enlarged bore 32 in the cylindrical float section 23 to provide a metal surface for engaging collar 21 on the track 14.

The cylindrical float section 23 is formed with a peripheral groove 33, about midway between its ends, to receive fishing line 34. A pair of spirally formed guides 35 and 36 may be supported on the main float section 11 as by a pair of brackets 37 and 38, attached to the track 14 at 39. The spiral guides 35 and 36 are positioned adjacent the groove 33 in the cylindrical float section 23 and are spaced a short distance from each other.

The float may be attached to a fishing line by first twisting the line about the spiral guide 36 until the line is positioned within the guide. The section of the line toward the the sinker may be wrapped around the cylindrical float section 23 in its peripheral groove 33. Finally, the attaching operation may be completed by twisting the line about the other spiral guide 35, so it will be positioned within the guide. With the line placed on the float in this fashion, reeling of the line inwardly or outwardly causes rotation of the cylindrical float section 23 relative to the guides and, therefore, relative to the main float section 11 and the track 14. Since the screw 26 has its threads cooperating with threads in nut 25, rotation of the cylindrical float section 23 causes axial movement of the screw 26. When the head 27 of the screw 26 engages nut 25, axial movement of the screw 26 is stopped and rotation of the cylindrical section 23 is prevented.

This arrests movement of the fishing line after a measured length has passed through the guides of the float, so a sinker 41 will be held at the desired distance below the float. Preferably, the outer face of side 17 of the track 14 is provided with indicia 17a to indicate the length of the fishing line which must pass through the float before rotation of cylindrical section 23 will be stopped. For example, these indicia may, as shown in Fig. 2, indicate five, ten and fifteen foot lengths. If it is desired to hold the sinker five feet below the float, the cylindrical float section 23 is first rotated until the head 27 is positioned adjacent the five foot mark on the track. Then, with the sinker held near the float, the fishing line is placed within the guide 36, around the cylindrical section 23 and within the guide 35. As the fishing line is is reeled out, the cylindrical section 23 as viewed in Fig. 4, will be rotated in a clockwise direction. The resulting relative rotation of screw 26 and the nut 25 will, in effect, screw the nut 25 on to the screw 26, causing axial movement of the screw into the sleeve 2. After five feet of fishing line has passed through the guides, the head 27 on the screws 26 will engage nut 25, so further rotation of the cylindrical float section will be stopped and the sinker 41 will be held five feet below the float.

To arrange for the sinker to be held at other levels in the water, it is only necessary to remove the fishing line from the float, adjust the cylindrical section 23 until the head 27 is adjacent the mark indicating the desired depth. The fishing line may then be rethreaded onto the float and the sinker lowered into the water. It is, of course, necessary that the device be calibrated so, depending upon the circumference of the groove 33 and the pitch of the threads on screw 26, the proper indicia will appear on the side 17 of the track.

It will be apparent from the foregoing description that the fishing line may be placed on and removed from the float without disturbing the sinker or hook secured to the end of the line. Depending upon conditions at the time the float is in use, it may be placed on the line to hold the sinker and hook at the most desirable depth below the surface of the water. Furthermore, the hook and sinker may be reeled in close to the fishing rod even though the sinker is a considerable depth below the float when in the water. This is an advantage over most types of stationary floats.

As other constructions embodying this invention are contemplated, it is desired that the foregoing description and the accompanying drawings be construed as illustrative rather than in a limiting sense.

What is claimed is:

1. A fishing float comprising a main float section, a cylindrical float section rotatable on said main section and formed with a peripheral groove, a screw movable axially of said cylindrical section by rotation of the latter, and stop means for limiting axial movement of said screw to prevent rotation of said cylindrical section.

2. A fishing float comprising a main float section, a cylindrical float section rotatable on said main section and formed with a peripheral groove, a pair of spiral guides carried by said main section and positioned adjacent said cylindrical float section for guiding a fishing line in said groove, a screw movable axially of said cylindrical section by rotation thereof, and stop means for limiting axial movement of said screw to prevent rotation of said cylindrical section.

3. A fishing float comprising a main float section, a track on said main section, a screw slidable along said track, a cylindrical float section rotatable on said track, and a nut carried by said cylindrical float section and threaded on said screw, said cylindrical float section being formed with a peripheral groove to receive a fishing line so that rotation of said cylindrical section by said line causes axial movement of said screw.

4. A fishing float comprising a main float section, a track on said main section, a screw slidable along said track, a cylindrical float section rotatable on said track, and a nut carried by said cylindrical float section and threaded on said screw, said cylindrical float section being formed with a peripheral groove to receive a fishing line so that rotation of said cylindrical section by said line causes axial movement of said screw, said track having indicia thereon to indicate the measured depth at which the fishing line may extend from said float.

5. A fishing float comprising a main float section, a cylindrical float section rotatably mounted on said main float section, a track carried by said main float section and in axial alinement with said cylindrical section, a screw slidably guided by said track, and a nut secured to said cylindrical section and threaded on said screw, said cylindrical section being formed with a groove to receive a fishing line whereby movement of the line rotates said cylindrical section causing axial movement of said screw.

6. A fishing float comprising a main float section, a cylindrical float section rotatably mounted on said main float section, a track carried by said main float section and in axial alinement with said cylindrical section, a screw slidably guided by said track, a nut secured to said cylindrical section and threaded on said screw, said cylindrical section being formed with a groove to receive a fishing line, and spiral guides carried by said main section and positioned adjacent said groove to guide the fishing line therein whereby movement of the line rotates said cylindrical section causing axial movement of said screw.

7. A fishing float comprising a main float section, a cylindrical float section rotatably mounted on said main section, said cylindrical float section being formed with a peripheral groove to receive a fishing line, a track on said main section axially alined with said cylindrical section, a stop movable along said track, means operated by relative rotation of said float sections for moving said stop along said track, and means on said track for limiting movement of said stop to prevent relative rotation of said sections, thereby arresting movement of the fishing line at a predetermined length.

8. A fishing float comprising a main float section, a cylindrical float section rotatably mounted on said main section, said cylindrical float section being formed with a peripheral groove to receive a fishing line, spiral guiding means carried by said main section and positioned adjacent said groove for guiding the fishing line therein, a screw movable axially of said cylindrical section, means operated by rotation of said cylindrical section relative to said main section for axially moving said screw, and stop means for limiting axial movement of said screw to prevent rotation of said cylindrical section, thereby arresting movement of the fishing line at a predetermined length.

9. A fishing float comprising a main float section, a cylindrical float section rotatably mounted on said main float section, a track on said main float section alined with the axis of rotation of said cylindrical float section, a stop member slidable along said track, stop engaging means in the path of said stop member, and threaded means so connecting said stop with said cylindrical float section that relative rotation of said float sections causes said stop to slide along said track and contact said stop engaging means.

10. A fishing float comprising a main float section, a cylindrical float section rotatably mounted on said main float section, said cylindrical float section being formed with a peripheral groove for receiving a fishing line, guide means carried by said main float section and positioned adjacent said groove for guiding the line in said groove, a track on said main float section alined with the axis of rotation of said cylindrical float section, a stop slidable along said track, stop engaging means in the path of said stop, and threaded means so connecting said stop with said cylindrical float section that relative rotation of said sections causes said stop to slide along said track and contact said stop engaging means.

11. A fishing float comprising a main float section, a cylindrical float section rotatably mounted on said main float section, a track on said main float section alined with the axis of rotation of said cylindrical float section, a stop member slidable along said track, threaded means so connecting said stop with said cylindrical float section that relative rotation of said float sections causes said stop to slide along said track, and stop engaging means at one end of said track for arresting longitudinal movement of said stop member and thereby preventing relative rotation of said float sections.

12. A fishing float comprising a main float section, a cylindrical float section rotatably mounted on said main float section, said cylindrical float section being formed with a peripheral groove for receiving a fishing line, guide means carried by said main float section and positioned adjacent said groove for guiding the line in said groove, a track on said main float section alined with the axis of rotation of said cylindrical float section, a stop slidable along said track, threaded means so connecting said stop with said cylindrical float section that relative rotation of said sections causes said stop to slide along said track, and stop engaging means at one end of said track for arresting sliding movement of said stop and thereby preventing relative rotation of said float sections.

13. A fishing float comprising a main float section, a cylindrical float section rotatably mounted on said main float section, a track on said main float section alined with the axis of rotation of said cylindrical float section, a stop slidable along said track, said stop being held by said track against rotation relative to said main float section, stop engaging means in the path of said stop, and threaded means, including a screw alined with said axis of rotation, so connecting said cylindrical float section with said stop that relative rotation of said float sections causes sliding movement of said stop along said track.

14. A fishing float comprising a main float section, a cylindrical float section rotatably mounted on said main float section, a track on said main float section alined with the axis of rotation of said cylindrical float section, a stop slidable along said track, said stop being held by said track against rotation relative to said main float section, threaded means, including a screw alined with said axis of rotation, so connecting said cylindrical float section with said stop that relative rotation of said float sections causes sliding movement of said stop along said track, and stop engaging means at one end of said track for engaging said stop to limit sliding movement of said stop on said track and thereby prevent relative rotation of said float sections.

ARTHUR H. HAGEN.

REFERENCES CITED

The following references are of record in the file of this patent:

UNITED STATES PATENTS

| Number | Name | Date |
| --- | --- | --- |
| 779,937 | Holt | Jan. 10, 1905 |
| 2,177,697 | Fairbanks | Oct. 31, 1939 |